US007797344B2

(12) United States Patent
Kaul et al.

(10) Patent No.: US 7,797,344 B2
(45) Date of Patent: Sep. 14, 2010

(54) METHOD FOR ASSIGNING RELATIVE QUALITY SCORES TO A COLLECTION OF LINKED DOCUMENTS

(75) Inventors: Rohit Kaul, Palo Alto, CA (US); Marcin Kadluczka, San Jose, CA (US); Yeogirl Yun, Mountain View, CA (US); Seong-Gon Kim, Mississippi State, MS (US)

(73) Assignee: Become, Inc., Sunnyvale, CA (US)

( * ) Notice: Subject to any disclaimer, the term of this patent is extended or adjusted under 35 U.S.C. 154(b) by 109 days.

(21) Appl. No.: 11/318,193

(22) Filed: Dec. 23, 2005

(65) Prior Publication Data

US 2006/0143197 A1     Jun. 29, 2006

Related U.S. Application Data

(60) Provisional application No. 60/638,952, filed on Dec. 23, 2004.

(51) Int. Cl.
    *G06F 7/00* (2006.01)
(52) U.S. Cl. ........................... 707/791; 707/899
(58) Field of Classification Search .............. 707/104.1, 707/3
    See application file for complete search history.

(56) References Cited

U.S. PATENT DOCUMENTS

| | | | |
|---|---|---|---|
| 4,953,106 A | 8/1990 | Gansner et al. | |
| 5,450,535 A | 9/1995 | North | |
| 5,748,954 A | 5/1998 | Mauldin | |
| 5,832,494 A | 11/1998 | Egger et al. | |
| 5,946,489 A | 8/1999 | Yellin et al. | |
| 6,014,678 A | 1/2000 | Inoue et al. | |
| 6,112,202 A * | 8/2000 | Kleinberg | 707/5 |
| 6,112,203 A | 8/2000 | Bharat et al. | |
| 6,269,368 B1 | 7/2001 | Diamond | |
| 6,285,999 B1 * | 9/2001 | Page | 707/5 |
| 6,321,220 B1 * | 11/2001 | Dean et al. | 707/3 |
| 6,356,899 B1 * | 3/2002 | Chakrabarti et al. | 707/5 |
| 6,560,600 B1 * | 5/2003 | Broder | 707/7 |
| 6,629,092 B1 | 9/2003 | Berke | |
| 6,738,678 B1 | 5/2004 | Bharat et al. | |
| 6,751,612 B1 | 6/2004 | Schuetze et al. | |
| 6,792,419 B1 | 9/2004 | Raghavan | |

(Continued)

OTHER PUBLICATIONS

K. Bharat et al., "Hilltop: A Search Engine based on Expert Documents," located at http://www.cs.toronto.edu/~georgem/hilltop/.

(Continued)

*Primary Examiner*—Tim T. Vo
*Assistant Examiner*—Anh Tai V Tran
(74) *Attorney, Agent, or Firm*—Carr & Ferrell LLP

(57) ABSTRACT

A method for assigning relative quality scores to a collection of linked documents is presented. The method includes constructing a spring network according to a connectivity graph of a linked database and determining the strength of inter-nodal springs based on the link structure of the network and the displacements on end-nodes. The method may further include computing the displacements of the nodes in a spring network through an iterative process and obtaining the quality scores for documents from the converged displacements of nodes. The method may also include obtaining the relative quality scores for groups of documents. The method may further include assigning topic-specific quality scores to documents in a linked database.

12 Claims, 5 Drawing Sheets

U.S. PATENT DOCUMENTS

| | | | |
|---|---|---|---|
| 6,799,176 | B1 | 9/2004 | Page |
| 6,871,202 | B2 | 3/2005 | Broder |
| 6,920,426 | B2 | 7/2005 | Takechi |
| 7,251,689 | B2 | 7/2007 | Wesley |
| 7,281,005 | B2 | 10/2007 | Canright et al. |
| 2002/0065857 | A1 | 5/2002 | Michalewicz et al. |
| 2002/0129014 | A1 | 9/2002 | Kim et al. |
| 2002/0169770 | A1 | 11/2002 | Kim et al. |
| 2002/0188527 | A1 | 12/2002 | Dillard et al. |
| 2003/0031123 | A1 | 2/2003 | Gilmour et al. |
| 2003/0117434 | A1 | 6/2003 | Hugh |
| 2003/0208482 | A1 | 11/2003 | Kim et al. |
| 2004/0068697 | A1 | 4/2004 | Harik et al. |
| 2004/0098390 | A1 | 5/2004 | Bayliss et al. |
| 2004/0243632 | A1* | 12/2004 | Beyer et al. ............... 707/104.1 |
| 2005/0060297 | A1 | 3/2005 | Najork |
| 2005/0086260 | A1* | 4/2005 | Canright et al. .......... 707/104.1 |
| 2005/0086384 | A1 | 4/2005 | Ernst |
| 2006/0004809 | A1 | 1/2006 | Zhang et al. |
| 2006/0036598 | A1 | 2/2006 | Wu |
| 2006/0059119 | A1 | 3/2006 | Canright et al. |
| 2006/0242564 | A1 | 10/2006 | Egger et al. |

OTHER PUBLICATIONS

J. Kleinberg, "Authoritative Sources in a Hyperlinked Environment," Journal of the ACM, vol. 46, No. 5, Sep. 1999, pp. 604-632.

S. Chakrabarti et al., "Automatic Resource Compilation by Analyzing Hyperlink Structure and Associated Text," In the Proceedings of the 7th World-Wide Web Conference, 1998, located at http://decweb.ethz.ch/WWW7/1898/com1898.htm.

S. Chakrabarti et al., "Focused crawling: a new approach to topic-specific Web resource discovery," In the Proceedings of the 8th World-Wide Web Conference, Toronto, May 1999 (Published by Elsevier Science B.V., 1999).

K. Bharat et al., "Improved Algorithms for Topic Distillation in a Hyperlinked Environment," In the Proceedings of the 21st ACM SIGIR Conference on Research and Development in Information Retrieval, vol. 21, ACM, 1998, located at ftp://ftp.digital.com/pub/DEC/SRC/publications/monika/sigir98.pdf.

S. Brin et al., "The Anatomy of a Large-Scale Hypertextual Web Search Engine," in WWW Conference, vol. 7, 1998, located at http://www7.scu.edu.au/programme/fullpapers/1921/com1921.htm.

J. Carriere et al., "Web Query: Searching and Visualizing the Web through Connectivity," Computer Networks and ISDN Systems 29, 1997, pp. 1257-1267, located at http://www.cgl.uwaterloo.ca/Projects/Vanish/webquery-1.html.

Z. Wang et al., "Prefetching in World Wide Web," IEEE 1996, pp. 28-32.

C. Boyle et al., "To link or not to link: An empirical comparison of Hypertext linking strategies," ACM 1992, pp. 221-231.

E. Garfield, "Citation Analysis as a Tool in Journal Evaluation," Essays of an Information Scientist, vol. 1, pp. 527-544, 1962-73 (Reprinted from Science, vol. 178, pp. 471-479, 1972).

N. Geller, "On the citation influence methodology of Pinski and Narin," Information Processing & Management, vol. 14, 1978, Pergamon Press Ltd., Great Britain, pp. 93-95.

P. Doreian, "Measuring the relative standing of disciplinary journals," Information Processing & Management, vol. 24, No. 1, 1988, Pergamon Journals Ltd., Great Britain, pp. 45-56.

P. Doreian, "A measure of standing for citation networks within a wider environment," Information Processing & Management, vol. 30, No. 1, 1994, Pergamon Press Ltd., Great Britain, pp. 21-31.

Botafogo et al., "Structural Analysis of Hypertext: Identifying Hierarchies and Useful Metrics," ACM Transactions in Information Systems, vol. 10, No. 2, Apr. 1992, pp. 142-180.

M. Frisse, "Searching for Information in a Hypertext Medical Handbook," Hypertext '87 Papers, Nov. 1987, pp. 57-66.

M. Marchiori, "The Quest for Correct Information on the Web: Hyper Search Engines," 1997, Computer Networks and ISDN Systems, vol. 29, No. 8-13, located at http://www.w3.org/People/Massimo/papers/WWW6/.

O. McBryan, "GENVL and WWWW: Tools for Taming the Web," In the Proceedings of the First International World Wide Web Conference, ed. O. Nierstrasz, CERN, Geneva, May 1994.

A. Arocena et al., "Applications of a Web Query Language," 1997, Computer Networks and ISDN Systems, vol. 29, No. 8-13, pp. 1305-1316, located at http://www.cs.toronto.edu/~websql/www-conf/wsqp/PAPER267.html.

M. Henzinger et al., "Measuring Index Quality Using Random Walks on the Web," 1999, in the Proceedings of the 8th International World Wide Web Conference, Toronto, Canada, pp. 213-225, located at http://www8.org/w8-papers/2c-search-discover/measuring/measuring.html.

* cited by examiner

METHOD FOR ASSIGNING RELATIVE QUALITY SCORES TO A COLLECTION OF LINKED DOCUMENTS

CROSS REFERENCE TO RELATED APPLICATION

The present application claims the priority benefit of U.S. Provisional Patent Application Ser. No. 60/638,952 filed Dec. 23, 2004 and entitled "Web Affinity Index Ranking System," which is herein incorporated by reference.

FIELD OF THE INVENTION

Embodiments of the present invention relates generally to a method for assigning relative quality scores to a collection of linked documents. More particularly, it relates to a method for assigning relative quality scores to nodes in a linked database, such as web pages in the World Wide Web or any other hypermedia database.

BACKGROUND OF THE INVENTION

The World Wide Web (Web) is a rapidly growing part of the Internet. One group estimates that, as of the beginning of 2000, the Web grows more than seven million web pages each day, adding to an already enormous body of information. Because of the Web's rapid growth and lack of central organization, however, millions of users cannot find specific information in an efficient manner. Over the last decade, Internet search engines, such as BECOME.com search engine, became some of the most important means of information retrieval on the Internet indexing over billions of web pages. As search engines increase their coverage, however, they exacerbate an existing problem. Search engines pull up all documents meeting the search criteria, which can overwhelm a searcher with millions of irrelevant documents. Once search results arrive, the searcher must review them one document at a time to find the relevant ones. Even if could the searcher can download many documents, average searchers are not always willing to review more than the first page of the search result display. Therefore, it is crucially important to present the most relevant documents to the searchers at the top of the list (e.g., in first ten results).

Because millions of documents may outwardly match the search criteria, the major search engines have a ranking algorithm that ranks high those documents having certain keywords in certain locations such as the title, or the meta-tags, or at the beginning of a document. This does not, however, typically put the most relevant document at the top of the list; much less assess the importance of the document relative to other documents.

Moreover, relying solely on the content of the document itself—including the meta-tags that do not appear when displayed—to rank the document can be a major problem to the search engine. A web author can repeat "hot" keywords many times, as a practice called spamming (e.g., in the title or meta-tags) to artificially inflate the relevance of a given document. Therefore, most Internet search engines in operation today use one of the variations of the link structure analysis. PageRank algorithm used by Google, for example, has been proven to be an effective measure against the conventional keyword-based spamming techniques. Recently, however, even PageRank has been found to be susceptible to a new generation of more sophisticated spamming techniques that manipulate the link structure of the Web. Over the years, webmasters and so-called "search engine optimization engineers" have learned how PageRank works and have figured out ways to manipulate its algorithm. One such technique is called "Google bombing" and has given Google many cases of unwanted publicity.

Another less known, yet potentially more damaging technique is called an "artificial Web". With a moderate investment, spammers can purchase a few IP addresses and large amount of disk storage spaces. The spammers can easily write scripts to generate millions or even billions of simple web pages that contain links to a few websites to be promoted. As the number of these artificial web pages can be comparable to that of the major portion of the real Web, the spammers can wield undue influence in manipulating the link structure of the entire Web, thereby affecting the computation of PageRank.

Vulnerability to the artificial Web reveals fundamental limitations of the conventional link analysis algorithms such as PageRank. One of the main reasons for their shortcoming is that these methods count all documents equally. The homepage of Yahoo.com is counted as one document just as the homepage of an obscure website maintained by a fourth-grader. This makes it possible for an artificial Web to siphon out substantial quantity of weighting factor from the real Web.

It is therefore desirable to provide a method for assigning relative quality scores of web pages with respect to one another that is not susceptible to these kinds of highly sophisticated spamming techniques.

SUMMARY OF THE INVENTION

The present invention relates generally to a method for assigning relative quality scores to a collection of linked documents, such as web pages in the World Wide Web. In an exemplary embodiment, the present invention assigns the relative quality scores by performing structure analysis of a spring network according to the connectivity graph of a linked database under consideration. The method adds one node for each document in the collection and connects nodes with elastic springs according to the link structure of the documents in the collection. Furthermore, all nodes are coupled to individual anchor springs to be held in place.

In an exemplary embodiment, a few nodes that correspond to reference documents that are known to be authoritative or of high quality are selected as reference nodes. The method then applies certain amounts of displacements to the reference nodes, and measures the displacements on the rest of the nodes resulting from this action. When new displacements are obtained, the strength of the inter-nodal springs is adjusted to reflect the "opinions" (on the connectivity) of the nodes with larger displacements being better. This change, in turn, induces further changes in the displacements of the nodes. This procedure is iterated until the displacements converge and do not change in a significant way. The relative quality score of a document is then defined as a quantity proportional to the final displacement on the node associated with the document. Embodiments of the present invention identify weak hyperlinks that join groups of illegitimate documents—as those created by the artificial Web—to the main portion of the database and properly penalizes them in a robust and efficient manner.

DETAILED DESCRIPTION OF THE INVENTION

Although the following detailed description contains many specifics for the purpose of illustration, anyone of ordinary skills in the art will appreciate that many variations and alterations to the following details are within the scope of the invention. Accordingly, the following embodiments of the invention are set forth without any loss of generality to, and without imposing limitations upon, the claimed invention.

Search Engine Architecture

For conciseness, embodiments of the present invention are described as a part of a search engine that collects, stores, indexes, and assigns quality scores to a collection of web pages in response to search queries. However, one of ordinary skill will understand after review of the specification that the present invention can be used in any linked database structure.

Figure 1:
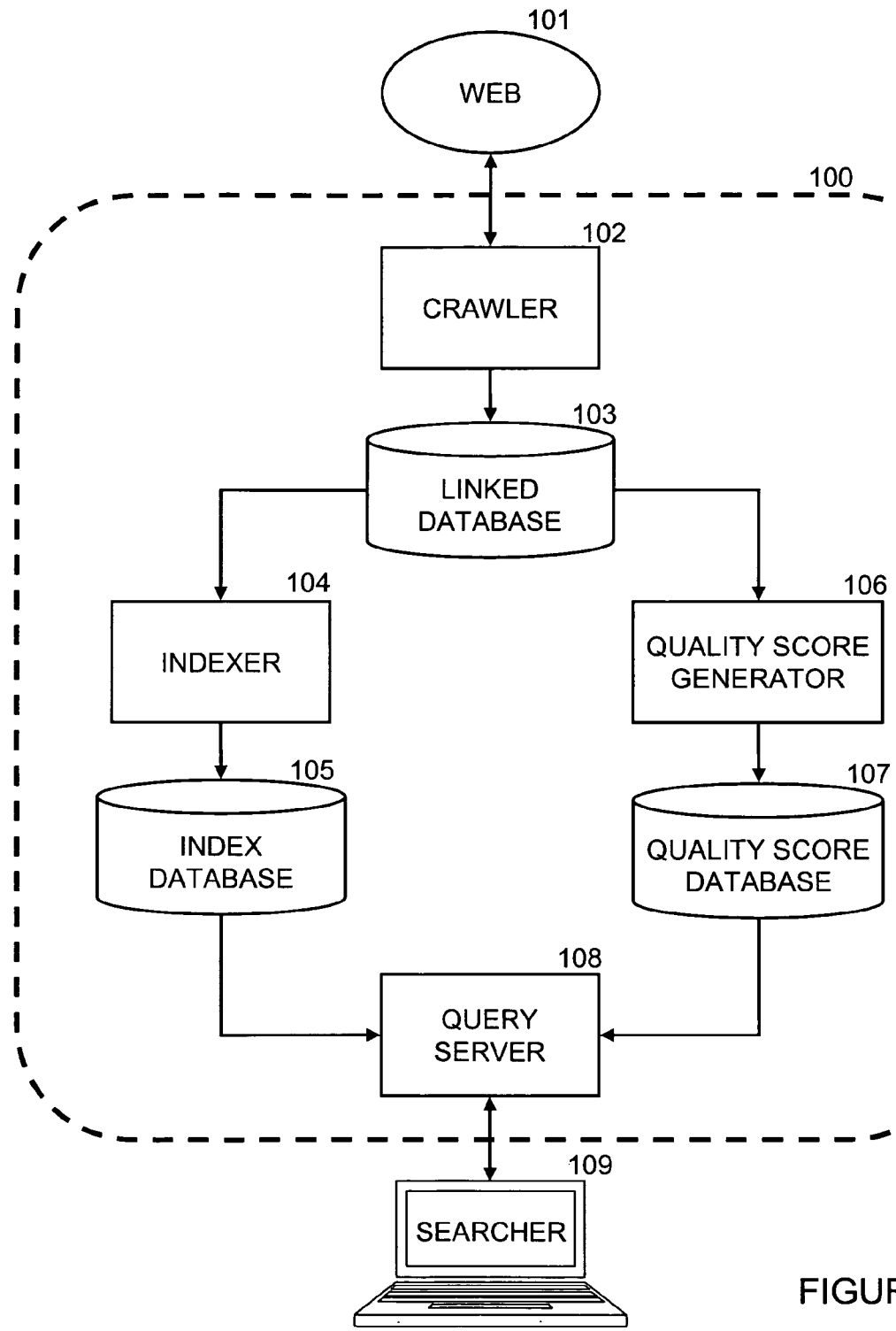
FIG. 1 illustrates an embodiment of the architecture of a search engine.

FIG. 1 illustrates one embodiment of a search engine 100, which comprises a crawler 102 to fetch web pages from the Web 101. In one embodiment, the search engine 100 is programmed in Java, runs on a Linux operating system, preferably in parallel using suitable Intel Pentium processors. It should be clear, however, that it is not essential to the invention that this hardware and operating system be used, and other hardware and operating systems can be used such as UNIX or Microsoft Windows XP. In an exemplary embodiment, multiple instances of the crawler 102 run to increase capacity to retrieve hypertext document collections such as web pages on the Web 101. The crawler 102 stores retrieved web pages in a linked database 103, which comprises data structures optimized for fast access.

The search engine 100 provides an indexing function in the following manner. An indexer 104 assigns a unique document identification number (DID) to each document in the linked database 103. The indexer 104 parses keywords from documents and generates a list of keyword-DID pairs. The indexer 104 then collects for each keyword the list of document identification numbers for all documents that contain the keyword and construct the index database 105 for fast retrieval.

The search engine 100 includes quality score generator 106 that assigns relative quality scores to all documents. The quality score generator 106 reads a link structure from the linked database 103 and employs one embodiment of the present invention to compute the quality scores for documents in a linked database as fully described in connection with FIG. 6 below. The quality score generator 106 stores the results in a quality score database 107 to be used by the query server 108.

One purpose of the search engine is to respond to a search query with the search results in order of relevancy. When a query server 108 receives a query from a search engine user 109, the query server 108 collects all documents associated with the given query from the index database 105. The exemplary query server 108 generates the content score of each document from intrinsic content information, such as frequency at which the query terms appear in the document, font size, and position of the query terms. In one embodiment, a higher content score is given if the query terms are in the title of the document. The query server 108 combines the content scores and quality scores to determine a relevancy score of each document to a given query. In an exemplary embodiment, the relevancy score of a document to a query is calculated by taking a geometric mean of the content score and the quality score:

$$R(i, q) = \frac{C(i, q) \cdot Q(i)}{C(i, q) + Q(i)}$$

where $C(i,q)$ is the content score of document i for query q and $Q(i)$ is the quality score of document i.

The query server 108 then ranks and sorts the results according to the relevancy score and presents the most relevant documents (e.g., ten) at a time to the search engine user 109.

In an exemplary embodiment, some of the steps for relevancy score evaluation are performed in advance to reduce the response time of the query server 108. For example, the complete relevancy scores for single-word queries may be processed in advance. The query server 108 uses the stored relevancy scores not only to respond immediately to single-word queries but also to combine them in a systematic way to construct the relevancy scores of multi-word queries.

Spring Network Representation of a Linked Database

Embodiments of the present invention relate to a method for assigning relative quality scores to a collection of linked documents. In an exemplary embodiment of the present invention, the first step is to construct a spring network representation of a linked database.

Figure 2:
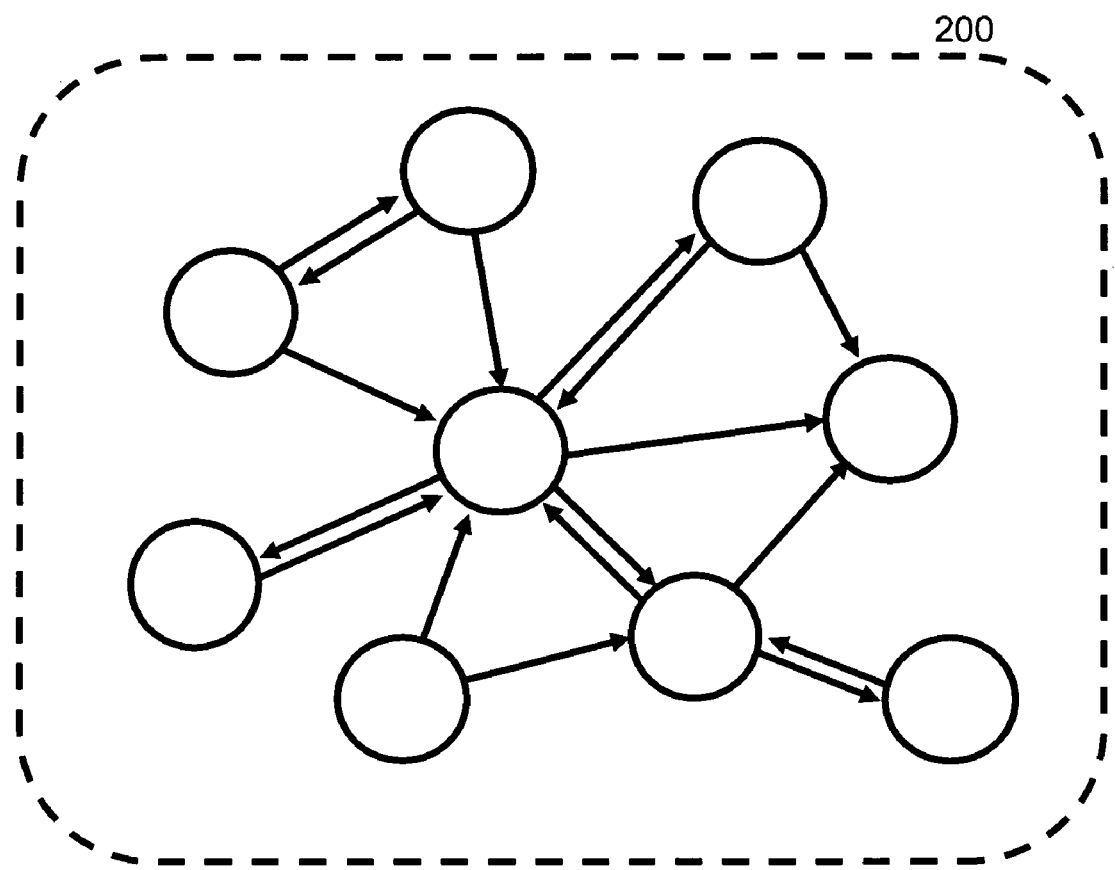
FIG. 2 illustrates a graphic representation of a collection of linked documents.

FIG. 2 illustrates a directed graph representation 200 of a linked database 103 (FIG. 1), such as the Web or other hypermedia archive. Each node (i.e., circle) corresponds to a hyperlinked document and directed connections (i.e., arrows) between nodes correspond to hyperlinks from one document to another. The links between two nodes can be unidirectional or bidirectional.

Figure 3:
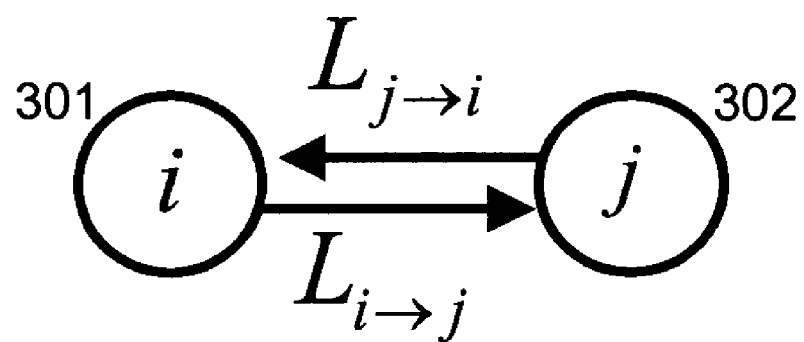
FIG. 3 illustrates a graphic representation of two documents and hyperlinks between them.

FIG. 3 illustrates a graphic representation of two documents and hyperlinks between them. The node i (object 301) and the node j (object 302), represent the documents with document identification numbers i and j. In an exemplary embodiment of the present invention, following the procedure described below, the link between two nodes can be further reduced to a single connection.

Figure 4:
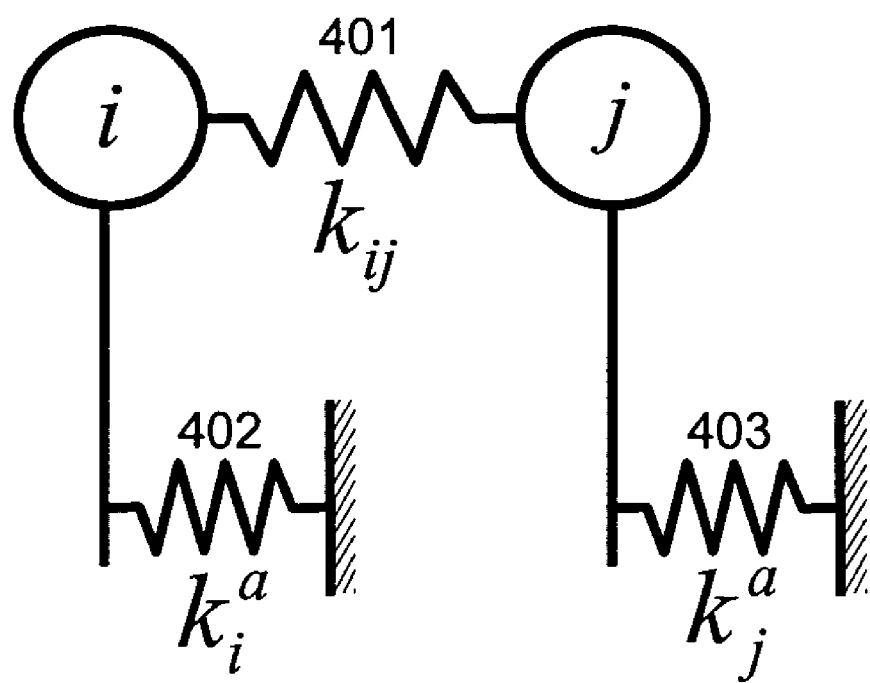
FIG. 4 illustrates a spring network representation of two documents and hyperlinks between them including the anchor springs for the documents.

FIG. 4 illustrates a spring network representation of two documents and hyperlinks between them including the anchor springs for the documents. In one embodiment, this connection can be described as a simple elastic spring connecting two points in a physical structure. The inter-nodal spring 401 represents a connection between the node i and node j established by hyperlinks between the nodes. In one embodiment, simple elastic springs are used to represent hyperlinks.

In an exemplary embodiment, some or all nodes are held in their places by anchor springs 402 and 403 in FIG. 4. In one embodiment all anchor springs have the same strength. In other embodiments, anchor springs may have different strength. For instance, one may use different schemes for anchoring (1) when websites are analyzed as a unit rather than individual documents, and (2) when the documents are analyzed within a given website, etc.

Figure 5:
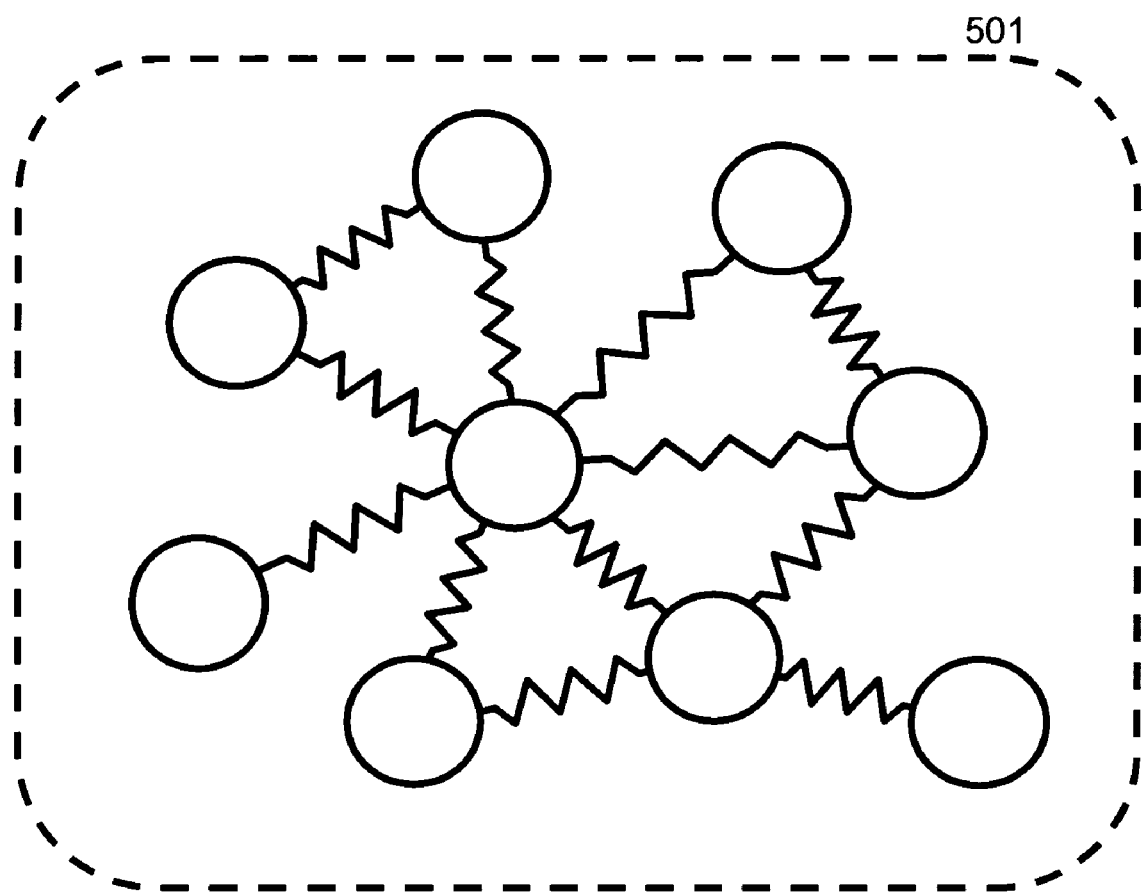
FIG. 5 illustrates a spring network representing a collection of linked documents.

In an exemplary embodiment, therefore, a spring network 501 as illustrated in FIG. 5 represents a linked database 103 (FIG. 1) as will be described in connection with the quality score generator 106 (FIG. 1). Each document is represented by a node, and hyperlinks between web documents are represented by simple elastic springs. For simplicity of illustration, the anchor springs are not shown in FIG. 5.

In an exemplary embodiment, a few documents that are known to be authoritative or of high quality, such as the homepage of CNET.com are selected as reference documents and the corresponding nodes are designated as reference nodes. A node that corresponds to a document that receives many hyperlinks from the reference documents is said to be well connected to the reference nodes. In an exemplary embodiment of the present invention, certain displacements are applied to the reference nodes and the displacements on the rest of the nodes (i.e., regular nodes) resulting from this action are measured. A (regular) node that is better connected to the reference nodes will experience bigger displacement than a (regular) node that is poorly connected to the reference nodes. The relative quality score, consequently, is defined to be a quantity proportional to the displacement of the nodes in the spring network 501 when the reference nodes are forced to move.

The displacements of nodes connected by simple springs can be obtained by balancing the total net force on each node:

$$\sum_j f_{ij} + f_i^a = 0 \quad (1)$$

The inter-nodal force $f_{ij}$ is the force exerted on node i by node j and this force is obtained from Hooke's law:

$$f_{ij} = k_{ij} \cdot (d_j - d_i) \quad (2)$$

Here $k_{ij}$ is a spring constant of the spring 401 (FIG. 4) between node i and node j. $d_i$ is displacement of the node i, while $d_j$ is displacement of the node j. The anchoring force $f_i^a$ is provided by:

$$f_i^a = -k_i^a \cdot d_i \quad (3)$$

where $k_i^a$ is a spring constant of the anchor spring 402 in FIG. 4.

In one embodiment, the spring constant $k_{ij}$ is obtained by the displacements of two end-nodes, the nodes attached to the ends of the spring:

$$k_{ij} = k_0 \{L_{i \to j} \cdot g(d_i - d_j) + L_{j \to i} \cdot g(d_j - d_i)\} \quad (4)$$

where $k_0$ is a constant representing the full value of the spring constant for the inter-nodal springs in the spring network 501. The quantity $L_{i \to j}$ represents the weighting factor of the link $i \to j$.

A weighting factor of a hyperlink measures the importance of a hyperlink. In one embodiment, $L_{i \to j} = 1$ if the link $i \to j$ exists and $L_{i \to j} = 0$ if the link $i \to j$ does not exist. In another embodiment, one can give each link a different weighting factor depending on several factors such as the offset of the link (i.e., position on the document) and the size of the paragraph where the link is located. In another embodiment, a link readily visible upon the loading of a document can have a higher weighting factor than the one visible only after scrolling down. In yet another embodiment, one can also assign different weighting factors for external links—links that point to documents in a different site—and internal links—links that point to documents in the same site. If there is no link from one document to another, the corresponding weighting factor is zero.

In an exemplary embodiment, the scaling function g(x) is a monotonically increasing function of its argument with the following properties:

$$\begin{cases} g(x) \to 1 & \text{as } x \to \infty \\ g(0) = 1/2 \\ g(x) \to 0 & \text{as } x \to -\infty \end{cases}$$

One of the simplest examples of such functions is a so-called Fermi-Dirac function:

$$g(x) = \frac{1}{1 + \exp(-x/\sigma)}$$

where σ is a constant parameter controlling the width of the transition region. In another embodiment, a simple step function can be used:

$$\begin{cases} g(x) = 1 & \text{if } x > 0 \\ g(0) = 1/2 \\ g(x) = 0 & \text{if } x < 0 \end{cases}$$

In another embodiment, instead of balancing the force on each node, the same displacement vector can be obtained by minimizing the total strain energy of the spring network. The total strain energy U of the spring network is given by $$U = \frac{1}{2} \sum_{i<j} k_{ij}(d_i - d_j)^2 + \frac{1}{2} \sum_i k_i^a d_i^2$$

Computation of Displacements

Physical spring networks observed and studied in physics or structural engineering exist in a 3-dimensional space. In an exemplary embodiment, it is sufficient to consider a spring network in one-dimension. Furthermore, one can place all nodes—including the anchors—at the same location, usually an origin, making the entire spring network geometrically equivalent to a single point. One can then place zero-length springs between nodes according to the link structures of the spring network 501. The final positions of the nodes are simply their displacements from the origin.

The spring network 501 has a trivial solution when there is no external force applied to the system; all displacements are zero. Nontrivial solutions arise when nontrivial boundary conditions are imposed on some of the nodes. In an exemplary embodiment, the displacements of a few reference nodes are set to certain fixed values. For the simplicity of subsequent analysis, we will consider the case when we select only a single reference node—called node 0—and set its displacement to a predetermined value $d_0$. When the node 0 is displaced out of its original position, all nodes connected to the node 0 by elastic springs will try to move in the same direction to reduce the tension in the inter-nodal springs. These nodes, however, are held in their places by their own anchor springs. Furthermore, these nodes also have their neighboring nodes attached to them by elastic springs that oppose their movement. Therefore, these nodes have to compromise between these opposing forces and minimize the overall strain energy.

In a physical or mechanical spring network, the strength of inter-nodal springs is a property of a given material, and does not vary when strained as long as the strain is not too large to go beyond the elastic regime and into the plastic deformation regime. In the present embodiment, however, the strength of the inter-nodal springs depends on relative displacements on end-nodes as shown in Eq. (4). Therefore, the governing equation Eq. (1) cannot be solved deterministically using a matrix equation. In other words, Eq. (1) is circularly defined—the problem $\{k_{ij}\}$ depends on the solution $\{d_i\}$—and must be solved self-consistently.

Figure 6:
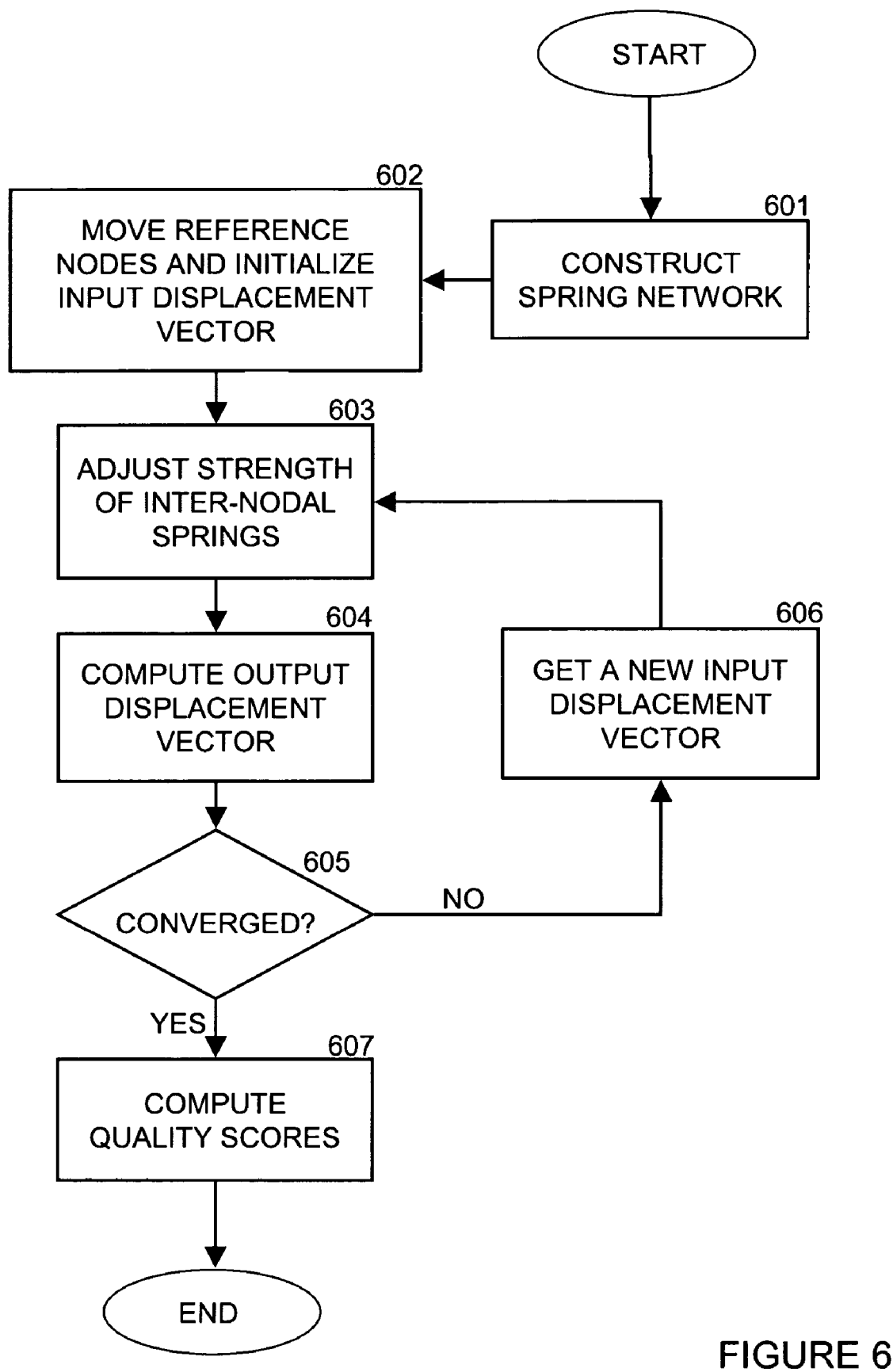
FIG. 6 illustrates an exemplary flowchart of a method for generating quality scores by a quality score generator of a search engine.

FIG. 6 shows a flow chart of one implementation of the present invention. In exemplary embodiments the method of FIG. 6 is performed by the quality score generator 106 of FIG. 1. In an exemplary embodiment, a spring network that corresponds to a linked database is constructed in step 601. In exemplary embodiments, the network construction is based on data from the linked database 103 (FIG. 1). In step 602, the quality score generator 106 displaces the references nodes, and initializes the input displacement vector $X=\{d_i\}^{(0)}$ by setting it to constant values such as zero. The quality score generator 106 solves Eq. (1) iteratively in the following manner:

1. For iteration step n, the strength of the inter-nodal springs, $\{k_{ij}\}^{(n)}$, is adjusted based on the input displacement vector $X=\{d_i\}^{(n-1)}$ using Eq. (4) in step 603.
2. In step 604, the inter-nodal forces and anchor forces on all nodes are computed using Eq. (2) and Eq. (3), respectively, and Eq. (1) is solved to get the output displacement vector $Y=\{\tilde{d}_i\}^{(n)}$.
3. In step 605, the input and output displacement vectors (X and Y) are compared. If they are converged, the iteration stops.
4. If not converged, the input and output displacement vectors, $\{d_i\}^{(n-1)}$ and $\{\tilde{d}_i\}^{(n)}$, are combined together to construct a new input displacement vector $X=\{d_i\}^{(n)}$ in step 606. The process then goes to step 603 and repeats until converged.

In one embodiment of step 605, a normalized error function is used to measure the convergence:

$$e = \frac{\sum_i (y_i - x_i)^2}{\left(\sum_i x_i\right)^2}$$

where $x_i$ and $y_i$ represent the components of the input displacement vector X and output displacement vector Y. In one embodiment of step 606, the quality score generator 106 combines the input and output displacement vectors using simple methods such as averaging, or a so-called simple mixing:

$$\{d_i\}^{(n)} = \alpha \cdot \{d_i\}^{(n-1)} + (1-\alpha) \cdot \{\tilde{d}_i\}^{(n)}$$

where $\alpha$ is a constant parameter between 0 and 1. In another embodiment, in the step 606, the quality score generator 106 uses more elaborate methods such as the extended Anderson Mixing method as described in V. Eyert, *A Comparative Study on Methods for Convergence Acceleration of Iterative Vector Sequence*, J. Comp. Phys. 124, 271-285 (1996), which disclosure is incorporated by reference.

Quality Score

Once the final displacements on all nodes are determined, the quality score generator 106 uses these values to determine the quality scores of the documents in step 607. The displacements result from the forced displacement of the reference node clearly reflects the degree that the documents are connected to the reference documents. In one embodiment, the quality score of a document is defined as the displacement of the node corresponding to the document:

$$Q(i) = d_i$$

The results may then be stored in the quality score database 107 (FIG. 1).

Group Quality Score

Group quality score is a relative quality score for a group of documents, such as a website, computed by dividing the documents into groups of documents and treating the groups as units of computation. It is calculated from an algorithm similar to the one used for quality scores of individual documents. In an exemplary embodiment, one node per each group is created in a spring network. Then all hyperlinks between the groups—all links between all documents that belong to the groups—are collapsed to a single spring that has the strength corresponding to the sum of the strength of all individual springs between the groups. Furthermore, one additional reference node is created for each group that contains one or more reference documents, and this reference node is connected to its associated group-node with a spring that has strength corresponding to the number of reference documents contained in the associated group. Once a new spring network is constructed, the group quality scores can be obtained by following a similar procedure described above for the quality scores of individual documents. In a preferred embodiment, the group quality score of a group of documents is defined as the displacement of the group-node corresponding to the group of documents:

$$Q_g(g) = d_g$$

Topic-Specific Quality Scores

Embodiments of the present invention can be used for assigning topic-specific, rather than general-purpose, quality scores to documents in a linked database. In one embodiment, a set of highly respected authoritative documents in a given topic is chosen as the reference documents. Then the topic-specific quality scores are obtained by following the same procedure used for the general-purpose quality scores. For example, search engines specializing on shopping, such as the BECOME.com search engine, can use the present invention to assign "shopping quality scores" to documents in a linked database. In this case, websites like Amazon's website or CNET's website would serve well as reference documents. The present invention can be applied to many different topic areas, such as medicine, sport, news, science, history, travel, etc.

Spamming Score

Embodiments of the present invention can also be used for many other purposes. For example, the present invention can be used to actively identify and penalize documents and their associates that employ spamming techniques. The spamming (or negative quality) score can be obtained in the following steps. 1) Obtain general-purpose quality scores and accompanying displacements for a spring network corresponding to a linked database by following the procedure described above. 2) Set the strength of inter-nodal springs according to Eq. (4) based on the displacements of the last step. 3) Identify a set of well-known spamming sites, selecting the corresponding nodes as the reference nodes, and set their displacements to predetermined values. 4) Obtain the displacements of the rest of the nodes without further adjustment of the strength of inter-nodal springs.

As the nodes for the known spamming sites are displaced, all the sites and web pages tightly connected to these spamming sites will follow them. As it is generally the case for today's Internet, these spamming sites tend to form tightly knit communities and be very well connected to each other with thousands or millions of links among them.

While embodiments of the present invention have been described with nodes being connected or having connections, it should be noted that the nodes may also be coupled together.

It will be clear to one skilled in the art that above embodiments may be altered in many ways without departing from the scope of the present invention. Accordingly, the scope of the present invention should be determined by the following claims and their legal equivalents.

What is claimed is:

1. A computer-implemented method for assigning scores to a plurality of linked documents, at least some of the documents being hypermedia documents, comprising:

constructing by a processor executing a program a spring network representation according to a connectivity graph of a collection of documents and links among the documents, the spring network representation including a plurality of nodes wherein each node corresponds to at least one document, the spring network representation further including an inter-nodal virtual spring connected between each pair of nodes associated with documents having a link between the documents, the inter-nodal virtual spring corresponding to the document link between the corresponding pair of documents;

adding a virtual anchor spring to each node in the spring network representation, each virtual anchor spring associated with only one node and not corresponding to a link between any documents;

identifying a plurality of nodes as one or more reference nodes and one or more regular nodes, each reference node preselected independently of any other node or relationship of the reference node with any other node;

(a) applying a predetermined amount of virtual input displacements on the reference nodes within the spring network representation, the virtual input displacements having constant values and collectively comprising a virtual input displacement vector;

(b) determining a virtual strength value for each inter-nodal virtual spring in the spring network representation, each inter-nodal spring virtual strength value derived from the virtual input displacement associated with the pair of nodes connected to a particular inter-nodal virtual spring;

(c) calculating one or more virtual inter-nodal forces and a virtual anchor spring force that collectively virtually act on each node in the spring network representation, each inter-nodal force derived from the product of the virtual strength value of the inter-nodal virtual spring and virtual displacement of a particular node, each virtual anchor spring force derived from the product of an anchor spring strength and the virtual displacement of the particular node;

(d) calculating a total force on each node in the spring network representation as the sum of all the virtual inter-nodal forces associated with each particular node and the virtual anchor spring force for the particular node, the total force on each node in the spring network representation collectively set as a virtual output displacement vector;

(e) comparing the virtual output displacement vector and the virtual input displacement vector for the plurality of nodes;

determining that the virtual output displacement vector and the virtual input displacement vector do not converge;

(f) adding the virtual output displacement vector and the virtual input displacement vector for the plurality of nodes to derive a new virtual input displacement vector as the sum of the virtual output displacement vector and the virtual input displacement vector, the adding performed based on the non-convergence, a new virtual input displacement vector to be used as a new predetermined amount of virtual input displacement vector;

repeating the steps (a)-(f), the repeated steps performed based on substituting the value of the pre-determined amount of virtual input displacement with values of the new virtual input displacement vector, the steps repeated until the virtual output displacement vector and the virtual input displacement vector converge; and assigning scores to documents based on values of the virtual output displacement vector of the nodes that correspond to the documents when the virtual output displacement vector and the virtual input displacement vector converge for each node within the spring network representation.

2. The method of claim 1, wherein the convergence is determined by an error function.

3. The method of claim 1, wherein the amount of displacements applied to reference nodes is uniform.

4. The method of claim 1, wherein the amount of displacements applied to reference nodes is dependent on a class of the associated documents.

5. The method of claim 2, wherein strength of additional springs is uniform and proportional to a full strength of inter-nodal springs.

6. The method of claim 2, wherein strength of additional springs is different for each node based on a classification of a corresponding document.

7. A computer readable storage medium having embodied thereon a program, the program being executable by a processor to perform a method for assigning scores to a plurality of linked documents, the method comprising:

constructing by a processor executing a program a spring network representation according to a connectivity graph of a collection of linked documents and links among the documents, the spring network representation including a plurality of nodes wherein each node corresponds to at least one document, the spring network representation further including an inter-nodal virtual spring connected between each pair of nodes associated with documents having a link between the documents, the inter-nodal virtual spring corresponding to the document link between the corresponding pair of documents;

adding a virtual anchor spring to each node in the spring network representation, each virtual anchor spring associated with only one node and not corresponding to a link between any documents;

identifying a plurality of nodes as one or more reference nodes and one or more regular nodes, each reference node preselected independently of any other node or relationship of the reference node with any other node;

(a) applying a predetermined amount of virtual input displacements on the reference nodes within the spring network representation, the virtual input displacements having constant values and collectively comprising a virtual input displacement vector;

(b) determining a virtual strength value for each inter-nodal virtual spring in the spring network representation, each inter-nodal spring virtual strength value derived from the virtual input displacement associated with the pair of nodes connected to a particular inter-nodal virtual spring;

(c) calculating one or more virtual inter-nodal forces and a virtual anchor spring force that collectively virtually act on each node in the spring network representation, each inter-nodal force derived from the product of the virtual strength value of the inter-nodal virtual spring and virtual displacement of a particular node, each virtual anchor spring force derived from the product of an anchor spring strength and the virtual displacement of the particular node;

(d) calculating a total force on each node in the spring network representation as the sum of all the virtual inter-nodal forces associated with each particular node and the virtual anchor spring force for the particular node, the total force on each node in the spring network representation collectively set as a virtual output displacement vector;

(e) comparing the virtual output displacement vector and the virtual input displacement vector for the plurality of nodes;

determining that the virtual output displacement vector and the virtual input displacement vector do not converge;

(f) adding the virtual output displacement vector and the virtual input displacement vector for the plurality of nodes to derive a new virtual input displacement vector as the sum of the virtual output displacement vector and the virtual input displacement vector, the adding performed based on the non-convergence, a new virtual input displacement vector to be used as a new predetermined amount of virtual input displacement vector;

repeating the steps (a)-(f), the repeated steps performed based on substituting the value of the pre-determined amount of virtual input displacement with values of the new virtual input displacement vector, the steps repeated until the virtual output displacement vector and the virtual input displacement vector converge; and assigning scores to documents based on values of the virtual output displacement vector of the nodes that correspond to the documents when the virtual output displacement vector and the virtual input displacement vector converge for each node within the spring network representation.

8. The method of claim 7, wherein the convergence is determined by an error function.

9. The method of claim 7, wherein the amount of displacements applied to reference nodes is uniform.

10. The method of claim 7, wherein the amount of displacements applied to reference nodes is dependent on a class of the associated documents.

11. The method of claim 8, wherein strength of additional springs is uniform and proportional to a full strength of inter-nodal springs.

12. The method of claim 8, wherein strength of additional springs is different for each node based on a classification of a corresponding document.

* * * * *